United States Patent
Mathia et al.

(10) Patent No.: US 7,474,927 B2
(45) Date of Patent: Jan. 6, 2009

(54) METHOD FOR OPTIMIZING CONTROL PARAMETERS

(75) Inventors: Michel Mathia, Couvet (CH); Vincent Very, Morteau (FR)

(73) Assignee: Etel S.A., Motiers (CH)

( * ) Notice: Subject to any disclaimer, the term of this patent is extended or adjusted under 35 U.S.C. 154(b) by 296 days.

(21) Appl. No.: 11/411,762

(22) Filed: Apr. 25, 2006

(65) Prior Publication Data

US 2006/0265171 A1 Nov. 23, 2006

(30) Foreign Application Priority Data

Apr. 27, 2005  (DE) ........................ 10 2005 019 522
Feb. 16, 2006  (DE) ........................ 10 2006 007 115

(51) Int. Cl.
*G05B 13/02* (2006.01)

(52) U.S. Cl. .............................. 700/31; 700/28; 700/32; 702/109

(58) Field of Classification Search .................. 700/28, 700/31; 703/2; 702/109
See application file for complete search history.

(56) References Cited

U.S. PATENT DOCUMENTS

| | | | |
|---|---|---|---|
| 5,394,322 A * | 2/1995 | Hansen | 700/37 |
| 6,259,221 B1 * | 7/2001 | Yutkowitz | 318/561 |
| 6,349,272 B1 * | 2/2002 | Phillips | 703/2 |
| 6,622,099 B2 | 9/2003 | Cohen et al. | |
| 6,687,658 B1 * | 2/2004 | Roychowdhury | 703/2 |
| 2002/0111758 A1 | 8/2002 | Wang et al. | |

2004/0204888 A1  10/2004  Mathia et al.

FOREIGN PATENT DOCUMENTS

| | | |
|---|---|---|
| DE | 103 16 977 | 10/2004 |
| EP | 1 180 734 | 12/2004 |

OTHER PUBLICATIONS

Partanen A.G. et al, "Two stage iterative identification/controller design and direct experimental controller refinement," Proceedings Of The Conference On Decision And Control, San Antonio, Dec. 15-17, 1993, New York, IEEE, US, vol. 3, Conf. 32, pp. 2833-2838, Dec. 15, 1993, XP0101116126; ISBN: 0-7803-1298-8.
Rao G.P. et al., "Identification of continuous-time systems," IEEE Proceedings: Control Theory and Applications, IEEE, Stevenage, Herts, GB, vol. 153, No. 2, pp. 185-220, Mar. 13, 2006, XP006026007, ISSN: 1350-2379.
Schrama R. J.P., "Accurate identification for control: the necessity of an iterative scheme," IEEE Transactions on Automatic Control USA, vol. 37, No. 7, pp. 991-994, XP002391838, ISSN: 0018-9286.
Zhuquan Zang et al, "H2 iterative model refinement and control robustness enhancement," Proceedings Of The Conference on Decision And Control, Brighton, Dec. 11-13, 1991, New York, IEEE, US, vol. 1, Conf. 30, Dec. 11, 1991, p. 279-284, XP010723157, ISBN:0-7803-0450-0.

* cited by examiner

*Primary Examiner*—Alexander J Kosowski
(74) *Attorney, Agent, or Firm*—Kenyon & Kenyon LLP

(57) ABSTRACT

In a method for optimizing control parameters, a transfer function of a transformer that includes a controller and a system to be controlled is ascertained experimentally. Quality criteria are derived from the transfer function of the transformer, the quality criteria being used for optimizing control parameters. Following a variation of the control parameters, a modified transfer function is calculated from the transfer function of the unmodified transformer without a new experimental identification.

10 Claims, 4 Drawing Sheets

METHOD FOR OPTIMIZING CONTROL PARAMETERS

CROSS-REFERENCE TO RELATED APPLICATIONS

The present application claims priority to Application No. 10 2005 019 522.9, filed in the Federal Republic of Germany on Apr. 27, 2005, and to Application No. 10 2006 007 115.8, filed in the Federal Republic of Germany on Feb. 16, 2006, each of which is expressly incorporated herein in its entirety by reference thereto.

FIELD OF THE INVENTION

The present invention relates to a method for optimizing control parameters. Such methods may be used to analyze and to optimize the control loop of a drive system of a special application. In this manner, optimized control parameters may be found for the utilized control structures.

BACKGROUND INFORMATION

The demands on modern drive systems are growing more and more. In a pick-and-place machine, for example, smaller and smaller components must be placed more and more precisely on a printed circuit board. In this context, the number of components per unit area of printed circuit board is increased continually by miniaturization such that the speed of the component positioning must continue to increase as well in order to maintain as high a throughput as possible in such a machine. Higher positioning accuracy at simultaneously shorter positioning times are contrary objectives, which can only be achieved by optimally parameterized control loops in conjunction with high-quality motors and position-measuring systems.

However, in order to be able to set the parameters of a control loop in an optimum manner, it is important that the knowledge of the drive system is as accurate as possible. One tool for analyzing a drive system is the ascertainment of the transfer function of the drive system or of a transformer within the drive system. This transfer function describes the attenuation and the phase shift which a signal of a particular frequency applied to the input of the transformer experiences up to the output. The ascertainment of the transfer function of the drive system or of the transformer (which ascertainment is also referred to as identification) should be performed for the open control loop, since knowledge of this "open loop" transfer function of the target system allows one to make an assertion regarding the stability of the drive system. As described below, the "open-loop" transfer function can be ascertained even in the case of a closed control loop.

To identify a control loop or more generally a transformer, an input signal is applied to the input of the control loop. The transfer function of the transformer can be determined by recording the input signal and the output signal occurring at the output of the transformer. For this purpose, the signals may be regarded as functions of time as well as, which is more common in this area of technology, as functions of frequency. The latter representation is believed to have advantages in the assessment of the properties of a control loop. The transfer function of a transformer results from the division of the output signal transformed into the frequency range by the input signal transformed into the frequency range. Criteria such as stability and sensitivity with respect to interferences (noise) can be readily assessed using the complex transfer function. Using optimization methods, an optimum parameter set may be found for the control structure by varying the control parameters.

German Published Patent Application No. 103 16 977 describes a method for identifying a control loop in which noise signals covering different frequency ranges are used as input signals. Thus, it is possible to adapt the intensity of every noise signal to the respective frequency range, thereby clearly improving the quality of the identification.

European Published Patent Application No. 1 180 734 describes an identification method using iterative optimization of the control parameters on the basis of quality criteria such as phase margin and amplitude margin. A new identification is performed following each change of the control loop. Since each identification may take a considerable amount of time, such a method is possibly quite time-consuming.

SUMMARY

Example embodiments of the present invention provide methods for optimizing control parameters in which the number of necessary identifications may be kept as small as possible.

A method is described for optimizing control parameters, in which a transfer function of a transformer that includes a controller and a system to be controlled is first ascertained experimentally. Quality criteria are derived from the transfer function of the transformer, the quality criteria being used for optimizing control parameters. Following a variation of the control parameters, a modified transfer function is calculated from the transfer function of the unmodified transformer without a new experimental identification.

It is possible with the aid of the algebra of transfer functions to calculate the transfer function of a transformer, which includes a controller and a system to be controlled (black box), if the transfer function of the transformer is once experimentally ascertained.

The transfer function of the controller, the structure of which is known, may be calculated, while the transfer function of the transformer may be experimentally determined. If the transfer function of the transformer is divided by the transfer function of the controller (in the parameterization, by which the experimental identification is performed), then the transfer function of the black box is obtained if the controller and the black box are connected in series as is customary. This transfer function of the black box does not change for other parameterizations of the controller or other control structures.

It is therefore possible to calculate the transfer function of the transformer for different parameterizations of the controller or even for different types of controllers on the basis of the computationally ascertained transfer function of the controller and the experimentally determined transfer function of the transformer or the black box.

An optimization method for parameterizing the controller, which is geared toward assessing the properties of the transfer function of the transformer, may therefore be performed without time-consuming repetitions of the experimental identification. An experimental identification is required only once for determining the transfer function of the transformer and thus also the transfer function of the black box. The repeatedly required determination of the transfer function of the transformer following the modification of the control parameters and of the quality criteria derived from this transfer function may be performed computationally.

The obtained optimum may be verified once more by an experimental identification, or a verification may be performed if the parameter set changed too much or if the control structure was changed.

According to an example embodiment of the present invention, a method for optimizing control parameters includes: experimentally ascertaining an initial transfer function of a transformer that includes a control structure and a black box as a system to be controlled; deriving quality criteria from the initial transfer function of the transformer, the quality criteria used to optimize the control parameters; and following a modification of the control parameters, calculating a modified transfer function from the initial transfer function of the unmodified transformer without a new experimental identification.

The modified transfer function may be calculated in the calculating step in accordance with a calculation of a transfer function of the control structure prior to the modification of the control parameters and a calculation of a modified transfer function of the control structure following the modification.

The modified transfer function may be calculated in the calculating step as a function of the initial transfer function of the unmodified transformer and of the unmodified and modified transfer functions of the control structure.

The method may include calculating a transfer function of the black box from experimentally obtained data and from the transfer functions of the control structure.

The controller and the black box may be series connected, and the modified transfer function may be calculated in the calculating step according to the relationship:

$$F_o' = F_o K'/K = BB*K';$$

$F_o'$ representing the modified transfer function, $F_o$ representing the initial transfer function, K representing an initial transfer function of the controller, K' representing a transfer function of the controller after the modification, and BB representing a transfer function of the black box.

At least one of the initial transfer function and the modified transfer function may apply to an open loop.

The initial transfer function may be ascertained in the ascertaining step for a closed control loop.

The initial transfer function may be ascertained in the ascertaining step by applying at least one noise signal to an input of the transformer.

A plurality of noise signals having different frequency ranges may be applied.

The noise signals may have varying intensities.

The transfer functions may be functions of frequency.

Further aspects and details of example embodiments of the present invention are described in more detail below with reference to the appended Figures.

DETAILED DESCRIPTION

First, the technical background of the method is described with reference to FIGS. 1a, 1b, 2a, 2b, 2c and 3.

Figure 1A:
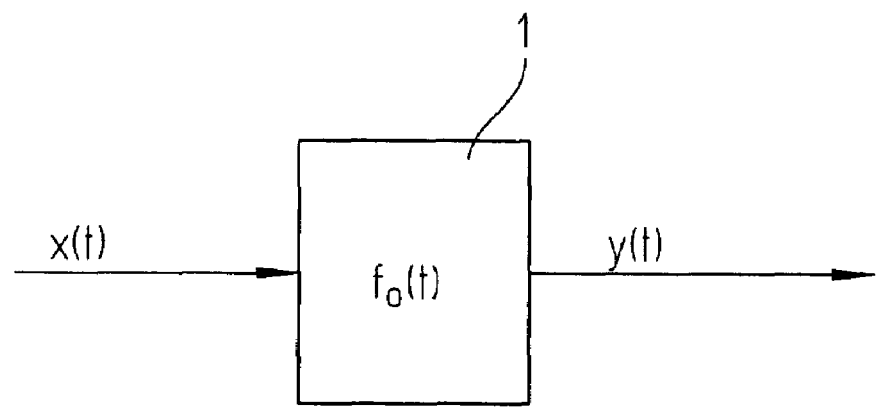
FIGS. 1a and 1b schematically illustrate a transformer.
Figure 1B:
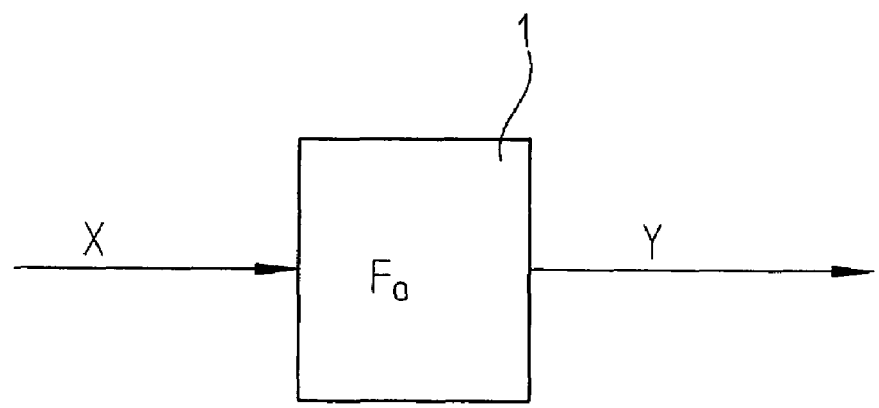

FIGS. 1a and 1b each illustrate a transformer 1. In the time representation illustrated in FIG. 1a, an input signal x(t) variable over time is applied to transformer 1, while on the output of transformer 1 a response y(t) variable over time is obtained. The relation between the two is defined by the pulse response $f_o(t)$, the convolution of which with x(t) yields exactly y(t).

Normally such systems are not considered in a time representation, but rather in a transformed representation as a function of frequency. This is indicated in FIG. 1b. Input signal X is transformed into output signal Y by the transfer function $F_o$. Since $F_o = Y/X$, the transfer function $F_o$ may be experimentally determined or identified by applying a known input signal X and measuring the output signal Y. For digital controllers, the Z-transformation is used for converting discrete signals in the time range into the frequency range.

Figure 2A:
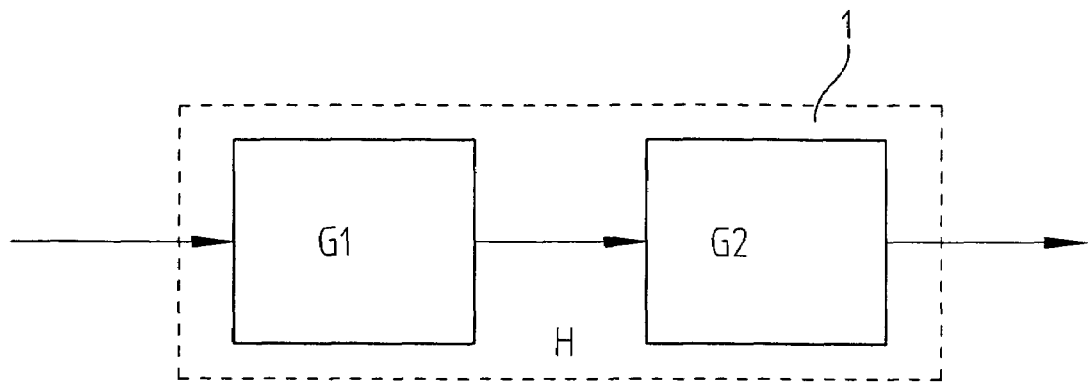
FIGS. 2a, 2b and 2c schematically illustrate different transfer functions.
Figure 2B:
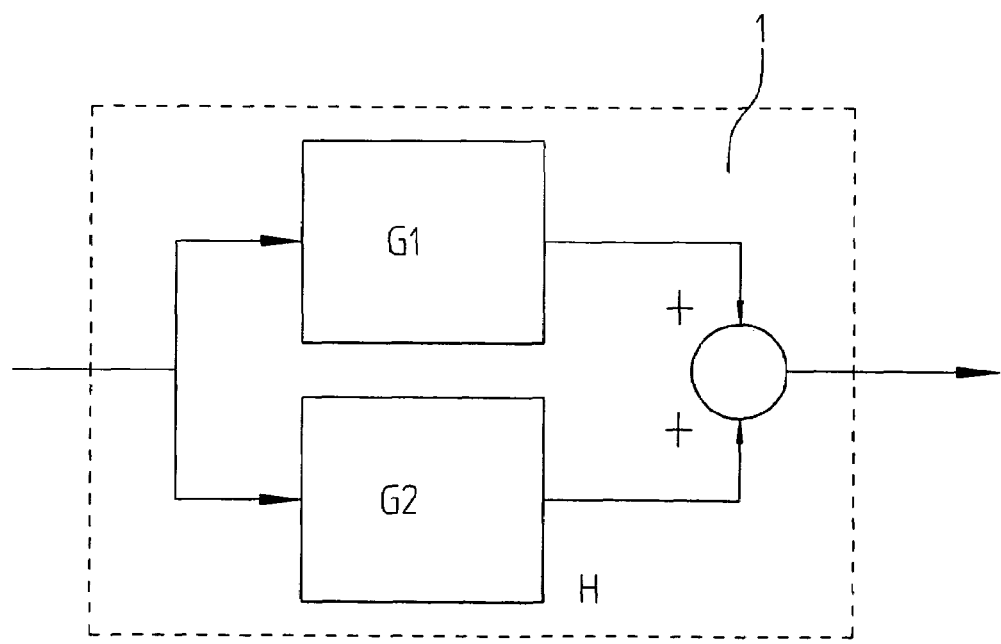
Figure 2C:
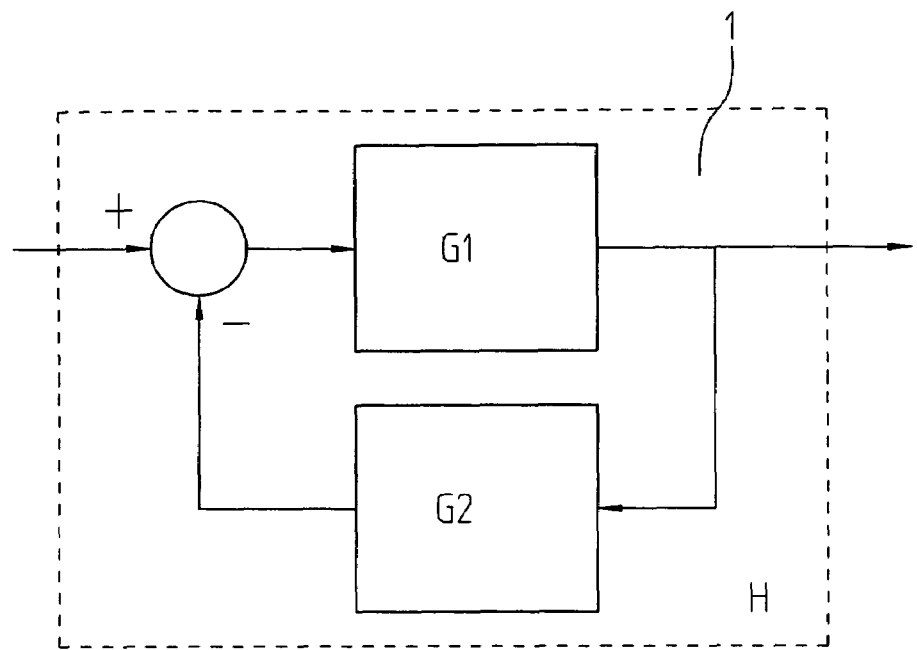

FIGS. 2a, 2b and 2c represent general relations of the algebra of such transfer functions, e.g., for the case of a series connection of two transfer functions G1 and G2 (see FIG. 2a), for the case of a parallel connection of two transfer functions G1 and G2 (see FIG. 2b) and for the subtractive feedback of the output of a transfer function G1 via a second transfer function G2 to the input of the first transfer function G1 (see FIG. 2c).

Figure 3:
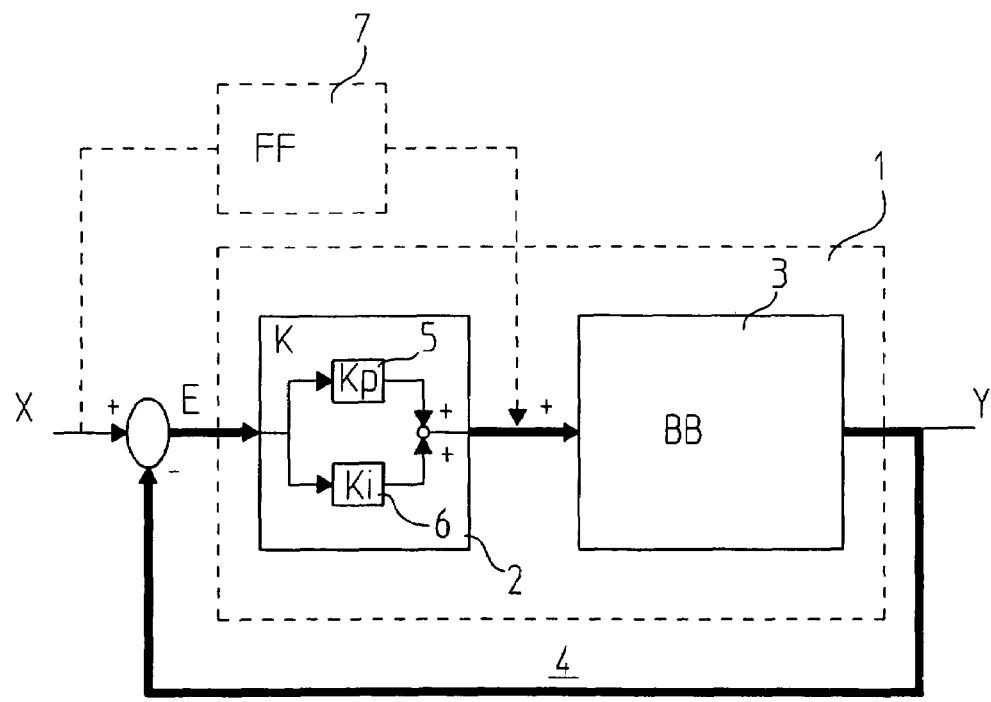
FIG. 3 schematically illustrates a control loop.

The transfer function H of the overall system as illustrated in FIGS. 2a, 2b and 2c are represented as follows:

FIG. 3 illustrates a control loop 4 having a transformer 1, which includes a controller 2 and a black box 3. Output Y of transformer 1 has a subtractive feedback to its input E. Controller 2 is in this example a PI controller having a P branch 5 and an I branch 6. The parameters of this controller are, for example, the proportional gain factor Kp and the integral gain factor Ki. Black box 3 includes the system to be controlled. If the controller is a current controller in a drive control loop, then the black box includes the power circuit of the drive and the electromotor, and the measured current that actually flows in the coils of the motor is then used as the feedback value.

The identification of the "open loop" transfer function $F_o$ of transformer 1 may occur while control loop 4 is open. For this purpose, the feedback branch of control loop 4, which connects output Y to input X, is to be interrupted. Input signal X=E is then applied immediately to transformer 1 and $F_o = Y/E = Y/X$.

Often, however, an opening of control loop 4 is not possible or not desirable since better results may be achieved with a closed control loop 4. Then there is the possibility of falling back onto the identification of the "open-loop" transfer function $F_o$ when control loop 4 is closed. It may need to be considered which signal is applied at the input of transformer 1. In the case illustrated in FIG. 3, for the required "open loop" transfer function $$F_o = Y/E = Y/(X-Y),$$

since a differential signal E from input signal X and output signal Y is applied at the input of transformer 1 and not, as in the case of the actually open control loop, directly the input signal X.

The identification of transfer function $F_o$ of transformer 1 illustrated in FIG. 3 may be performed experimentally. Since the transfer function K of controller 2 is easy to calculate (formula of FIG. 2b), the transfer function BB of black box 3 may be derived. In the present simple case of the series connection of controller 2 and black box 3

$$BB=F_o/K.$$

Black box 3 itself may include further control loops. If controller 2 is a position controller, for example, then black box 3 may include the control loops for speed and current or torque in a drive system that are connected downstream of the position controller. For identifying the transfer function BB of black box 3 this is not considered to be important since it may be computationally ascertained using the experimentally ascertained "open loop" transfer function $F_o$ and the known control structure 2.

As indicated by a dashed line in FIG. 3, a precontrol signal may be applied between controller 2 and black box 3. This precontrol signal is obtained from input signal X by a precontrol 7 having the transfer function FF. According to the rules of the algebra of transfer functions, the "open-loop" transfer function $F_o$ results in $$F_o=(K*Y)/(K*(X-Y)+FF*X)$$

for the identification in a closed control loop. In many applications, however, the precontrol may be omitted for optimizing the control parameters Kp, Ki, that is, FF=0 may be set.

Figure 4:
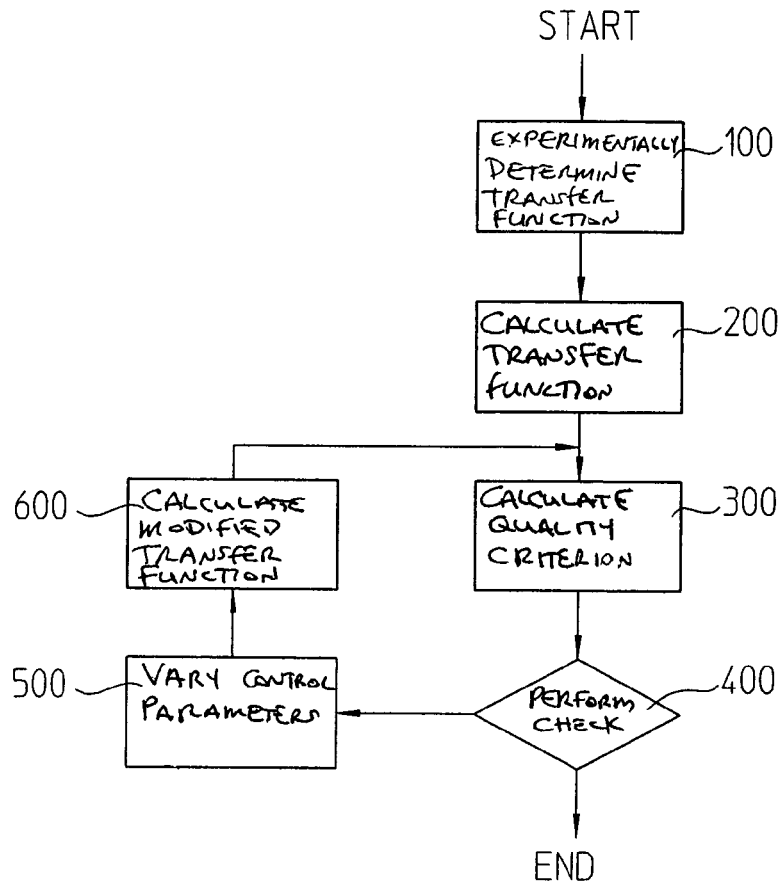
FIG. 4 illustrates a method for optimizing control parameters.
Figure 5:
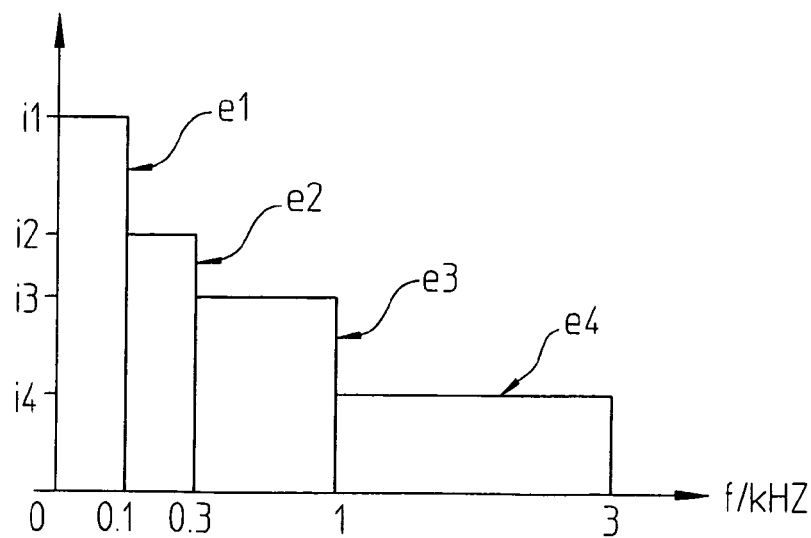
FIG. 5 schematically illustrates an excitation spectrum for identifying a transfer function.

A method for optimizing control parameters Kp, Ki of control loop 4 is illustrated in FIG. 4.

In a step 100, the "open loop" transfer function $F_o$ of transformer 1 is determined experimentally. As described above, this may be done while control loop 4 is open or closed. The identification is performed by applying an input signal X or a differential signal E and measuring the response Y of transformer 1.

In a step 200, transfer function K of controller 2 in transformer 1 is calculated on the basis of its current parameterization. In the simple case of a series connection of controller 2 and black box 3, transfer function BB of black box 3 in transformer 1 results in $$BB=F_o/K.$$

The calculation is somewhat more complex if, as indicated in FIG. 3, a precontrol 7 having a transfer function FF is used. Then, the following applies:

$$BB=Y/(FF*X+K*(X-Y)).$$

In a step 300, a quality criterion Q is calculated on the basis of the current transfer function $F_o$ of the transformer. This quality criterion Q, for example, allows for an assertion regarding the stability of control loop 4 or regarding its sensitivity with respect to interferences (noise). It is quite possible to calculate several such criteria. More details regarding suitable quality criteria are found below in the appendix.

In a step 400, a check is performed to determine whether quality criterion Q corresponds to the set requirements. If this is the case, then the method is terminated, an optimizing of control parameters Kp, Ki having concluded or not being required. Alternatively, a check may also be performed to determine whether a specified number of optimization steps has already been reached. Additional termination criteria are possible.

If quality criteria Q are not satisfactory or if the specified number has not been reached, then the method branches off to step 500, in which control parameters Kp, Ki are varied. For this purpose, many different strategies (testing of combinations having a certain increment, direction of the greatest rise, "simulated annealing," Newton-Gauss, Fletcher-Powell, Fletcher-Reeves, Neider-Mead, least squares method, etc.) may be used for variation in order eventually to arrive at parameter records that are as optimized as possible.

Instead of a new experimental identification of the modified (due to the changed control parameters Kp, Ki) transfer function $F_o'$, a time-saving calculation of $F_o'$ is performed in step 600. Since it is possible to calculate the modified transfer function K' of the controller, it is also possible to calculate the modified transfer function $F_o'$ as $$F_o'=K'*BB, \text{ or } F_o'=F_o*K'/K.$$

This applies to the simple case of the series connection of controller 2 and black box 4 as illustrated in FIG. 3 without precontrol.

In the more complex case using precontrol 7 indicated in FIG. 3, transformer 1 should be considered more broadly. It contains the complete system between input X and output Y. Transfer function $F_o$ is the transfer function between X and Y when control loop 4 is closed. Following the experimental identification of this transfer function $F_o$ and the calculation of the transfer function BB of black box 3 from $$BB=Y/(FF*X+K*(X-Y))$$

the modified transfer function $F_o'$ $$F_o'=BB*(FF'+K')/(1+BB*K')$$

results.

The calculation of transfer function BB of black box 3 is used only as an intermediary step, which in the repeated calculation of a modified transfer function $F_o'$ only needs to be performed once and thus may save computing time. Generally it is the case that the modified transfer function $F_o'$ may be calculated as a function of the unmodified transfer function $F_o$ experimentally ascertained during the identification (or similarly as a function of the experimentally ascertained signals X or E and Y) and the unmodified and modified transfer functions K, FF, K', FF' used in control structure 2, 7.

The method is continued again with step 300, in which quality criterion Q is calculated anew on the basis of the now current modified transfer function $F_o'$.

The order of the individual steps or partial steps of the method illustrated in FIG. 4 may be varied.

The method is continued until the quality criterion satisfies all requirements or until the method is terminated from outside or by a time lapse if the requirements placed on quality criterion Q are too high. It is also possible, however, simply to execute a specified number of optimization steps before the method presented is broken off. This may be particularly practical if quality criterion Q in addition to satisfying certain minimum requirements, e.g., regarding the stability in another parameter is to become as good as possible, for example, with respect to the bandwidth BW of "closed loop" transfer function $F_c$ (for calculating BW and $F_c$, see appendix) of closed control loop 4.

The identification may be done by applying one or several noise signals, e.g., in the form of white noise. As explained in more detail in German Published Patent Application No. 103 16 977, however, an input signal X, which, as illustrated in FIG. 4, includes noise in several frequency bands e1, e2, e3, e4, may be particularly suited for an identification. Since frequency bands e1, e2, e3, e4 may be applied in sequence, an intensity i1, i2, i3, i4 adapted to the respective spectral sensitivity is possible. Regarding the details of a corresponding method, reference is made to German Published Patent Application No. 103 16 977, which is expressly incorporated herein in its entirety by reference thereto.

The method described here may be particularly suited for digital control loops 4 since all processes may be executed in an automated manner and particularly quickly by a computer program. Particularly the calculation of the modified transfer function $F_o'$ following the variation of the control parameters Kp, Ki may proceed especially simply and quickly.

The method described here may also be used in systems having one axis or having several axes, in which the optimum parameterization for the controller 2 of an axis depends on the position of the respective axis or also of the additional axes. For such systems, one may either look for a set of control parameters Kp, Ki that provides a satisfactory result in all possible positions or one may use variable control parameters Kp, Ki that depend on the position of the respective axes. In both cases, it may be very difficult to find optimized control parameters Kp, Ki using conventional methods. One may either need very many experiments in order to verify each set of control parameters in every possible position of the axis or the axes, or one may need to rely exclusively on simulations, which may result in a great uncertainty and thus necessarily in very conservatively selected control parameters Kp, Ki.

In the application of the above-described method in a multi-axis system, the transfer functions $F_o$ of the axes involved may only need to be ascertained once for each possible combination of axis positions and a quality criterion Q derived from this for each of these possible combinations. For this purpose, one may select meaningful steps for the examined axis positions such that position-dependent changes in the quality criterion Q may be well represented. To this end, for example, for a positioning table movable along two mutually perpendicular axes, a surface may be represented on a screen, the raster points of which are colored in accordance with quality criterion Q. Critical regions, in which quality criterion Q only achieves a poor value, may be represented in red, for example, while regions, in which quality criterion Q is satisfactory, may be represented in green. Thus it may be very simple for a user of the method to decide with one look whether the selected set of control parameters Kp, Ki leads to a satisfactory result in the entire travel range of the positioning table. It may also be provided to represent individual components of quality criterion Q such as the bandwidth or the stability indicator (see appendix). It is thus possible, for example, when looking for optimum parameter sets, to be able to detect already in the simulation whether there are instabilities in any one of the possible positions of the system. Thus it is possible to avoid damaging the system when testing the new parameter set.

Once quality criterion Q has been experimentally ascertained in this manner for the entire range of the possible axis positions for a set of control parameters Kp, Ki, then in accordance with the above-described method it is possible computationally to take into account changed control parameters Kp, Ki and to calculate and display an updated graphical representation of quality criterion Q across the range of the possible axis positions.

In turn, it is possible to perform the optimization of control parameters Kp, Ki in an automated manner, for example, on the basis of one of the optimization methods mentioned earlier. For this purpose, either quality criterion Q may be drawn upon in a single position and the simulation of quality criterion Q for the other positions of the system considered only for verification, or the quality criteria Q of all positions may be taken into account in the optimization. For every possible position of the system, a separate set of control parameters Kp, Ki may be optimized, which are then used as location-dependent control parameters for controlling the system.

APPENDIX

Described below is an example of what is considered to be a particularly suitable quality criterion.

The following considerations may be undertaken for a digital control system. The identification of the open-loop transfer function $F_o(fk)$ is performed at a sampling frequency of 24 kHz using 4096 points in a frequency range of $fk/Hz=24000*k/4096$; $k=1$ to 2048; i.e., 6 Hz to 12 kHz.

The following equation applies:

$$F_C(f_k) = \frac{F_O(f_k)}{1 + F_O(f_k)} \quad \text{("closed-loop"} - \text{transfer function)}$$

$$S_{yp}(f_k) = \frac{1}{1 + F_O(f_k)} \quad \text{("sensitivity"} - \text{transfer function)}$$

The following applies for the control characteristic (MM: modulus margin (a stability criterion described in the relevant literature), BW: bandwidth, HA: highest amplification, LA: lowest amplification below frequency of HA, SI: stability indicator):

$$MM = \min(\text{abs}(S_{yp}(f_k)^{-1})) = \min(\text{abs}(1 + F_O(f_k)))$$

$$SI = \frac{1}{2048} \cdot \sum_{k=1}^{2048} 20 \cdot \log 10(\text{abs}(S_{yp}(f_k)))$$

$$HA = \max(\text{abs}(F_C(f_k)))$$

$f_{peak}$ is defined by $\text{abs}(F_C(f_{peak})) = HA$ $LA = \min(\text{abs}(F_C(f_k)))$ where $f_k < f_{peak}$ $kbw = \min(k)$ where $f_k > f_{peak}$ and $20 \cdot \log 10(\text{abs}(F_C(f_{k-1}))) < -3$ [dB]

$$BW = f_{kbw-1} + (f_{kbw} - f_{kbw-1}) \cdot \frac{10^{-3[dB]/20} - \text{abs}(F_C(f_{kbw-1}))}{\text{abs}(F_C(f_{kbw})) - \text{abs}(F_C(f_{kbw-1}))}$$

Examples for quality criteria to be satisfied, which may turn out to be different depending on the system, would then be:

$$20 \cdot \log 10 \left( \frac{1}{1 - MM} \right) > 6 \quad [dB]$$

$\text{abs}(SI) < 0.1$ [dB]

$20 \cdot \log 10(HA) < 1$ [dB]

$20 \cdot \log 10(LA) > -2$ [dB]

A quality criterion Q, which includes all these boundary conditions, and which additionally allows for a maximization of bandwidth BW, would be:

$$Q = \log 10 \begin{Bmatrix} C_1/BW + \\ \exp(C_2 \cdot (6 - 20 \cdot \log 10(1/(1-MM)))) + \\ \exp(C_3 \cdot (-0.1 + \mathrm{abs}(SI))) + \\ \exp(C_4 \cdot (-1 + 20 \cdot \log 10(HA))) + \\ \exp(C_5 \cdot (-2 - 20 \cdot \log 10(LA))) \end{Bmatrix}$$

The coefficients C1 to C5 in this example depend on the requirements placed on the respective system. Q very quickly grows to be very large if one of the mentioned partial criteria is not satisfied. The smaller Q is, the better. This allows for the use of common optimization algorithms in order to find a parameter set Kp, Ki that has a Q that is as small as possible.

What is claimed is:

1. A method for optimizing control parameters, comprising:

experimentally ascertaining an initial transfer function of a transformer that includes a control structure and a black box as a system to be controlled;

deriving quality criteria from the initial transfer function of the transformer, the quality criteria used to optimize the control parameters; and following a modification of the control parameters, calculating a modified transfer function from the initial transfer function of the unmodified transformer without a new experimental identification;

wherein a controller of the control structure and the black box are series connected, and the modified transfer function is calculated in the calculating step according to the relationship:

$F_o' = F_o K'/K = BB*K';$ $F_o'$ representing the modified transfer function, $F_o$ representing the initial transfer function, K representing an initial transfer function of the controller, K' representing a transfer function of the controller after the modification, and BB representing a transfer function of the black box.

2. The method according to claim 1, wherein the modified transfer function is calculated in the calculating step in accordance with a calculation of a transfer function of the control structure prior to the modification of the control parameters and a calculation of a modified transfer function of the control structure following the modification.

3. The method according to claim 2, wherein the modified transfer function is calculated in the calculating step as a function of the initial transfer function of the unmodified transformer and of the unmodified and modified transfer functions of the control structure.

4. The method according to claim 3, further comprising calculating a transfer function of the black box from experimentally obtained data and from the transfer functions of the control structure.

5. The method according to claim 1, wherein at least one of the initial transfer function and the modified transfer function apply to an open loop.

6. The method according to claim 1, wherein the initial transfer function is ascertained in the ascertaining step for a closed control loop.

7. The method according to claim 1, wherein the initial transfer function is ascertained in the ascertaining step by applying at least one noise signal to an input of the transformer.

8. The method according to claim 7, wherein a plurality of noise signals having different frequency ranges are applied.

9. The method according to claim 8, wherein the noise signals have varying intensities.

10. The method according to claim 1, wherein the transfer functions are functions of frequency.

* * * * *